Jan. 1, 1963　　　E. BLAHA　　　3,071,359
APPARATUS FOR FORMING CLAY SPHERES
Filed March 19, 1962

*INVENTOR.*
EMIL BLAHA

BY *E. Willford Mason*

ATTORNEY.

ered the type disclosed in Patent No. 2,215,079. Burn-

United States Patent Office 3,071,359
Patented Jan. 1, 1963

3,071,359
APPARATUS FOR FORMING CLAY SPHERES
Emil Blaha, Cheltenham, Pa., assignor to Selas Corporation, of America, Dresher, Pa., a corporation of Pennsylvania
Filed Mar. 19, 1962, Ser. No. 180,637
8 Claims. (Cl. 263—36)

The present invention relates to the expansion of clay particles, and more particularly to a furnace in which the clay in granular or pellet form is heated to fusion temperature. At this temperature, each of the clay particles bloats or expands to form a hollow sphere.

In the prior art, hollow clay spheres have been formed by discharging clay particles in a stream in an elongated flame. As the particles travel with the flame, they are heated to fusion temperature and expand. This operation causes the stream of particles to spread, and due to their tacky condition, many of them adhere to the walls of the chamber in which they are being made. In a relatively short time, the accumulation on the walls of the chamber becomes so great that the equipment has to be shut down for cleaning. So far as I am aware, equipment of this type has never been commercially successful because of the short operating periods and the low yield of an acceptable product.

It is an object of this invention to provide apparatus for expanding clay particles, in which the particles fall freely through a heated zone, where they are fused and expanded. It is a further object of the invention to provide a method and apparatus for making hollow clay spheres in which the tendency for the material to stick to the apparatus is greatly diminished.

Another object of the invention is to provide means to control the supply of clay particles to the fusing zone of the apparatus, and means to withdraw the fused spheres, so that there is substantially no agglomeration thereof.

The invention includes structure forming a vertically extending furnace chamber having a preheating chamber located thereabove.

Means is provided to supply particles first to the preheating chamber and then through a flow controlling device to the furnace chamber. The particles fall freely through this latter chamber, and are heated to the fusion temperature while they are falling. At the lower end of the chamber, they are chilled and discharged to a point of collection.

The present application is a continuation-in-part of my application Serial No. 20,692, filed April 7, 1960, entitled, Apparatus for Forming Clay Spheres.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
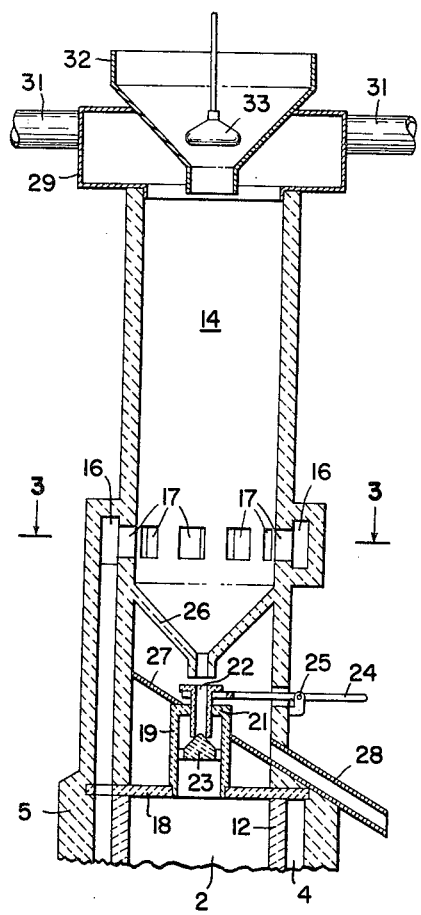
FIG. 1 is a section view of the upper part of the apparatus, showing the preheating chamber and the particle flow controlling device.
Figure 2:
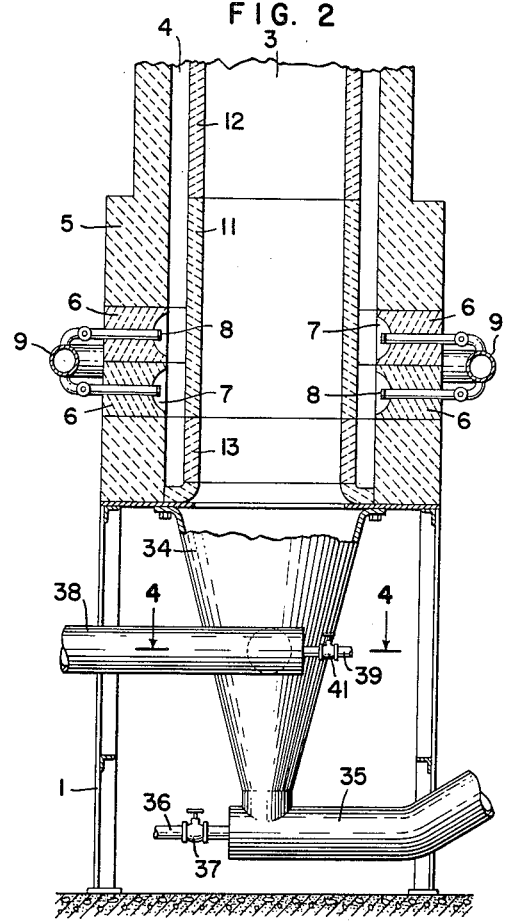
FIG. 2 is a section view of the lower portion of the apparatus, showing the furnace chamber and the fused particle collecting means.
Figure 3:
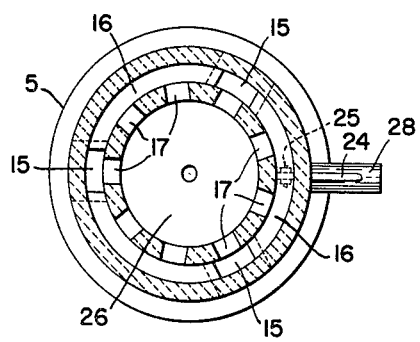
FIG. 3 is a view taken on line 3—3 of FIG. 1.
Figure 4:
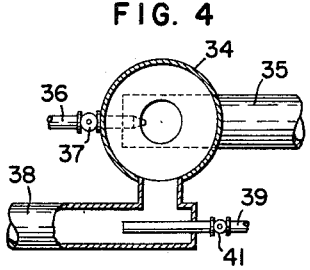
FIG. 4 is a view taken on line 4—4 of FIG. 2.

Referring to the drawings, there is shown in FIG. 2 the lower portion of the furnace structure, which is mounted on a framework 1 of structural steel. The furnace includes a furnace chamber 2, that is formed by an inner cylindrical muffle or wall 3. On outer furnace wall 5 surrounds wall 3, and is separated therefrom by an annular combustion space 4, that extends to the top of wall 3. A number of burners 6 are built into the lower portion of the furnace wall 5, and are spaced around the same in order to heat the muffle 3 and the combustion chamber evenly. These burners may be of any suitable type, but preferably, and as shown herein, are of the type disclosed in Patent No. 2,215,079. Burners of this type include a cup-shaped depression 7 formed in the face of the burner that is, in fact, a portion of the furnace wall. Fuel in the form of a combustible mixture is supplied by means of a distributor 8 to the cup, and is burned along the surface thereof to heat it to incandescence. This, along with the products of combustion, heats muffle wall 3, and therefore chamber 2. All of the distributors of the various burners are supplied from a common manifold 9. Wall 3 is made of a plurality of rings of refractory material, whose composition varies at different elevations. The portion 11 of the wall immediately in front of the burners and a short distance thereabove is made of some highly refractory material, such as aluminum oxide. As the products of combustion from the burners rise, they will cool somewhat, so that it is important to have the upper portion 12 of the wall made of a material having a high heat conductivity, such as silicon carbide. The lower portion of the wall is formed of a ring 13 of some porous refractory material, such as silicon carbide, so that some of the products of combustion can pass into the furnace chamber for reasons set forth below.

The hot products of combustion from the burners are collected at the upper end of the space 4, and are supplied to a preheating chamber 14, that is vertically above, and may be constructed as an extension of, the furnace chamber 2. For this reason, there are provided a plurality of ducts 15 extending from the upper end of space 4 to a channel 16 that surrounds the preheating chamber. A number of openings 17 are provided between this channel and the chamber, so that the products of combustion can flow into the chamber from all sides and heat it evenly.

Material to be treated flows between the preheating chamber 14 and the furnace chamber 2, at a rate that is controlled by a valve apparatus located in the structure between these two chambers. As disclosed herein, the top of chamber 2 consists of a plate 18, which may be of a suitable heat resistant alloy, or a refractory ceramic material. This plate is provided with a centrally located opening, above which is placed a cylindrical member 19, having its upper end turned inwardly, as indicated at 21. A collecting sleeve 22, through which the material to be treated flows, is slidably received within the flange 21, and has its lower end cooperating with the apex of a conical guide member and stopper 23, that is suitably fastened in position across the interior of member 19. Sleeve 22 can be moved vertically through a short distance by a lever 24, having a forked end that extends beneath a flange on the upper end of the sleeve. The lever is suitably pivoted at 25 on the outer surface of the apparatus. Material is directed into sleeve 22 by a cone-shaped member 26, that forms the bottom of preheating chamber 14. Material overflowing from the sleeve is collected in a space in the apparatus between the two chambers. To this end, the lower portion of this space is formed by a shield 27, that is mounted at an angle to the vertical, so that the material will flow down this shield and through a spout 28 to a collecting point.

Material is supplied to preheating chamber or zone 14, and the products of combustion are exhausted therefrom through a sheet metal hood 29, which forms the top thereof. The hood is provided with a plurality of ducts 31, through which the products of combustion are discharged, and is also provided with a supply cone 32, that is centrally located above the preheating chamber. A stopper or valve 33, cooperating with the inner surface of this cone, controls the flow of material into the preheating chamber.

The heated material is collected at the bottom of furnace chamber or fusing zone 2 by means of a collecting zone 34, which is suitably fastened to the framework 1, and which also serves to prevent loss of radiant heat from the chamber. The lower end of this cone discharges into a pipe 35 that delivers the material to some suitable collection point. As the material falls into pipe 35, it is carried to the discharge point by a blast of air under suitable pressure from a supply 36 that is controlled by a valve 37.

The pressure in the furnace chamber 2 can be controlled by exhausting the gases therein through a pipe 38 that is connected to one side of cone 34. Gas is aspirated through this pipe by means of air under pressure from a pipe 39 that is regulated by a valve 41.

In the operation of the apparatus, the burners, and the products of combustion from them in space 4, will be fired to heat wall 3 and chamber 2 to a temperature of from approximately 2950° F., immediately in front of the burners, to about 2650° F. at the top of the chamber. The spacing of the burners around the structure insures that all portions of the chamber will be heated evenly. The temperatures attained will heat the wall to incandescence, so that radiant heat will be projected therefrom inwardly against all portions of the stream of particles falling through the chamber. The products of combustion are collected at the top of space 4, and travel through ducts 15 to be discharged into the lower portion of preheating chamber 14. When these products of combustion are introduced into chamber 14, they are from 1800° F. to 2000° F. The temperature of the gases is greatly reduced by preheating particles falling through chamber 14 prior to the time the gases are discharged through ducts 31.

Clay particles in the form of cylinders or pellets are loaded into the supply cone 32, and are discharged at a regulated rate through this cone, the rate being adjusted by valve 33. These particles are preferably of a substantially uniform size and shape, so that the action of the heat will be the same on each particle, and so that they will have the same falling characteristics. The particles fall freely through chamber 14, forming a preheating zone, and are heated by the products of combustion therein. These particles are funneled by the cone 26 into sleeve 2. It is noted that more particles must be supplied to this sleeve than is possible to pass through the same. Thus, the sleeve, at all times, is kept full to overflowing, and the surplus is collected on shield 27 to be discharged through the spout 28 and reused. Lever 24 is moved to raise sleeve 22 above the surface of cone 23, thereby permitting an annular column of the clay particles to fall through the sleeve into furnace chamber 2, forming a fusion zone. This annular column of the particles will fall straight through the chmaber, and in so doing, is heated by radiation from wall 3 to above the fusion temperature of the clay, which will vary with its type, but which will be in the neighborhood of 2500° F. It has been determined that the particles of some shapes tend to spread from their columnar form as they reach the lower portion of chamber 42. For this reason, section 13 of wall 3 is made porous, so that a small quantity of products of combustion can pass radially inward through this wall to move these particles back to the center of the chamber, and keep them away from the chamber wall. The products of combustion introduced in this manner, however, are not sufficient, or moving at a high enough velocity, to create enough turbulence in chamber 2 to disturb the pattern of the falling particles.

The particles have fused by the time they reach the bottom of the burners, and have been expanded or drawn by their surface tension into hollow spherical shapes. The hollow spheres begin to cool before they reach cone 34, and are directed into discharge pipe 35, where the air supply through pipe 36 will blow these spheres to a point of collection. The air also helps to chill the spheres, so that they will not stick together as they are being removed.

One of the main reasons why prior apparatus of this type has not been practical, from a commercial point of view, is due to the fact that the particles are heated in a turbulent atmosphere. When they reach fusion temperature, they are tacky on their surfaces, and those which are moved into engagement with the walls of the heating chamber, by the turbulence in the chmaber, stick to these walls. After a relatively short period of time, the walls have become so clogged up that there is not enough area left for the particles to pass through the chamber. Furthermore, the particles that have accumulated on the surface of the heating chamber wall have an insulating value, and reduce the temperature of the chamber. It is, therefore, important that the particles be supplied to the heating chamber in such a fashion that they will fall freely in the center of the fusion zone, out of engagement with the chamber wall, but be dispersed enough so that each particle will be penetrated by heat. Such a flow is obtained with the valve device, comprising sleeve 22 and cone 23. It has been found that, if the sleeve 22 is kept full at all times, the particles will flow in an annular column around the edge of cone 23, straight down, without bouncing toward the wall of the furnace chamber. If, however, the sleeve 22 is not full, the particles will not fall in a true column, but will tend to bounce against the sides of the chamber, and if they strike it, will adhere thereto when they have been heated enough to become tacky. For this reason, it is necessary to keep the sleeve 22 full at all times. The rate of flow of the particles should be as great as possible, but should not be enough to permit sleeve 22 to become empty at any time. This rate of flow can be adjusted as required by changing the elevation of sleeve 22 relative to cone 23, and the flow can be cut off entirely by moving the sleeve against the cone. Another advantage of this type of particle flow control is that the annular stream of particles is a loose enough mass, so that the radiant heat being directed inwardly from wall 3 will heat evenly all of the particles as they are falling through the chamber. Consequently, each particle will be fused individually into a sphere by the time it reaches the bottom of the fusion zone 2.

In view of the fact that the particles are falling through a heated chamber, and are in the chamber for only a very short period of time, it is desirable to bring them up to as near fusion temperature as possible in the preheat chamber. Care must be taken, however, to make sure that the particles have not reached a temperature at which their surfaces have begun to become tacky before they enter sleeve 22, otherwise they will stick together and clog up the feeding device.

From the above description, it will be seen that I have provided an apparatus in which clay particles are first preheated and then supplied in a vertically descending column through a chamber in which they are fused. These particles are then discharged from the chamber to a point of collection. The apparatus is so designed that the particles will fall freely, and will not engage the surface of the chamber wall. The flow of particles can be regulated so that they fall vertically, and the falling column is loose enough so that all of the particles can be heated to fusion temperature before reaching the bottom of the furnace chamber.

While in accordance with the provisions of the statutes, I have illustrated and described the best form of embodiment of my invention now known to me, it will be apparent to those skilled in the art that changes may be made in the form of the apparatus disclosed, without departing from the spirit and scope of the invention, as set forth in the appended claims, and that in some cases certain features of my invention may be used to advantage without a corresponding use of other features.

What is claimed is:

1. Apparatus for heat treating particles comprising structure forming a preheat chamber and a furnace chamber displaced vertically with respect to each other, means to supply particles to said preheat chamber, and means to control the flow of particles between said chambers comprising means forming an entrance at the top of said furnace chamber, a conical member smaller than said entrance located centrally thereof with its apex directed upwardly, a sleeve with its inner diameter smaller than the base of said member, means to mount said sleeve for vertical movement between a first position in which its lower end receives and rests upon said member, and a second position above the first to provide an annular opening between said member and sleeve, and means in the bottom of said preheat chamber to supply particles to said sleeve in a greater quantity than can pass therethrough.

2. The combination of claim 1 including means between said chambers in which the surplus particles not going through said sleeve are collected.

3. In apparatus of the class described, the combination of a wall forming a vertically extending furnace chamber, structure surrounding and spaced from said wall, a plurality of burners located in said structure to heat said wall and thereby said chamber, a portion of said wall being porous and through which products of combustion may flow into said chamber, means at the upper end of the space between said structure and wall to collect the remainder of the products of combustion, means at the upper end of said chamber to introduce material to be treated therein in a vertically descending column, and means below and connected to said chamber to collect the treated material.

4. The combination of claim 3 including means in communication with said material collecting means operative to control the pressure in said chamber.

5. The combination of claim 3 including means forming a preheat chamber above said furnace chamber, said products of combustion collecting means being connected to said preheat chamber to supply the products of combustion thereto, and said means to introduce including a valve between said preheat chamber and said furnace chamber.

6. Apparatus for expanding clay particles including structure forming a preheat chamber and a furnace chamber in superposed relation and having a portion of said structure between said chambers, burners surrounding said furnace chamber to heat the same, means to introduce clay particles in a predetermined quantity into the top of said preheat chamber, valve means located between said two chambers to control the flow of particles in a second and smaller quantity to said furnace chamber, said valve means including a sleeve having a passage therein which may when fully open be incapable of passing said predetermined quantity of particles, the portion of said structure between said chambers forming a collecting zone between said chambers adjacent to said valve into which any surplus particles fall, means to conduct the products of combustion from the burners from said furnace chamber to said preheat chamber around said valve means and collecting zone, and means through which the particles can be removed from said zone.

7. Apparatus for providing hollow clay articles and the like including structure forming a preheat chamber, additional structure forming a fusion chamber below said preheat chamber, burner means surrounding said fusion chamber and outside of the same to heat said fusion chamber, means to collect products of combustion from said burner means and pass them upwardly through said preheat chamber, means to supply particles to be heated to said preheat chamber to flow through the same into and through said fusion chamber, means to control the flow of particles between said chambers including means to direct particles into said fusion chamber in an annularly shaped, free falling stream, said last mentioned means including a conical member in the upper end of said fusion chamber, a vertical cylinder smaller in diameter than the base of said member telescoped over the apex of said member, means to adjust said cylinder vertically with respect to said member, and means to supply particles from the interior of said preheat chamber to said cylinder.

8. Apparatus for heat treating discrete particles including a wall forming a vertically extending heating chamber, structure spaced from and surrounding said wall, burners in said structure to heat said wall and thereby heat said chamber, said wall being provided with a section extending around the same that is porous and through which products of combustion from said burners may pass into said chamber, means at the top of said chamber to introduce particles to be treated in a vertically descending stream, means at the bottom of said chamber to collect said particles, pneumatic means to discharge said collected particles to a remote point, and means located adjacent to said collecting means to withdraw said gases from said chamber and thereby control the pressure in said chamber.

No references cited.